United States Patent [19]
Ho et al.

[11] Patent Number: 5,967,813
[45] Date of Patent: Oct. 19, 1999

[54] EJECTOR MECHANISM FOR CARD BUS CONNECTOR

[75] Inventors: Yu-Ming Ho, Pen-Chiao; Hung-Chi Yu, Taipei Hsien, both of Taiwan

[73] Assignee: Hon Hai Precision Ind. Co., Ltd., Taipei Hsien, Taiwan

[21] Appl. No.: 09/177,045

[22] Filed: Oct. 22, 1998

[30] Foreign Application Priority Data

Oct. 22, 1997 [TW] Taiwan .................................. 86217975

[51] Int. Cl.$^6$ .................................................. H01R 13/62
[52] U.S. Cl. .......................................................... 439/159
[58] Field of Search ................................... 439/159, 162, 439/152

[56] References Cited

U.S. PATENT DOCUMENTS

| | | | |
|---|---|---|---|
| 521,737 | 6/1894 | Chen et al. | 439/157 |
| 5,324,204 | 6/1994 | Lwee | 439/64 |
| 5,383,789 | 1/1995 | Watanable | 439/159 |
| 5,456,610 | 10/1995 | Barnakiś et al. | 439/157 |
| 5,507,658 | 4/1996 | Ho | 439/159 |

*Primary Examiner*—Neil Abrams
*Assistant Examiner*—J. F. Duverne

[57] ABSTRACT

An ejector mechanism for a card connector (1) is disclosed. The connector has an elongate housing (101) fixedly receiving a number of contacts (11). The housing has a bottom face for proximity to a PCB (3) on which the connector is mounted and a top face. The connector further includes a lower shielding (15) fixed to the bottom face, an upper shielding (13) fixed to the top face and a guiding frame (12) fixed to lateral ends of the housing for guiding a card into/out of the connector. The ejector mechanism has a push-rod reciprocally mounted on the guiding frame. The push-rod has a distal end (1211) with an L-shaped configuration defining a hole (1214) between a horizontal section (1213) and a vertical section (1212) thereof and a proximal end (1221) for receiving a push force. An ejector lever 1120 is pivotably mounted on the lower shielding member and has a force-receiving end (1121) bent away from the lower shielding member into the hole in the distal end of the push-rod. An ejector plate (1110) is reciprocally mounted on the ejector lever and drivably connected therewith whereby when the ejector lever is pivoted by pushing the proximal end of the push-rod toward the housing, the ejector plate moves away from the housing to eject a card inserted into the card connector.

6 Claims, 7 Drawing Sheets

EJECTOR MECHANISM FOR CARD BUS CONNECTOR

BACKGROUND OF THE INVENTION

1. Field of the Invention

The present invention relates to an ejector mechanism for a card bus connector, and particularly to an ejector mechanism having a connecting structure provided between a reciprocally mounted push-rod and a pivotably mounted ejector lever of a card bus connector.

2. The Prior Art

Figure 1A:
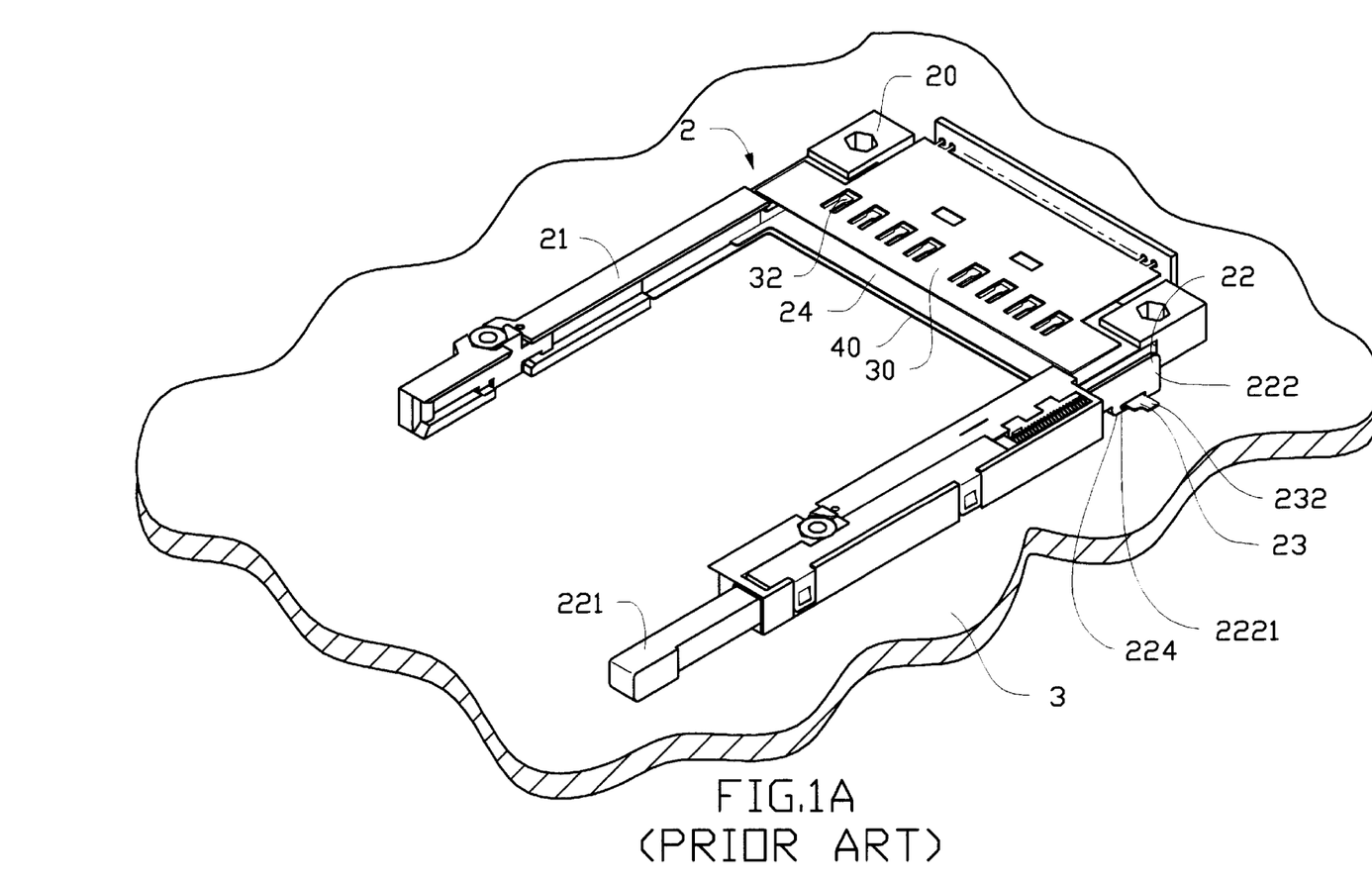
FIG. 1A is a perspective view of a conventional card bus connector mounted on a PCB.
Figure 1B:
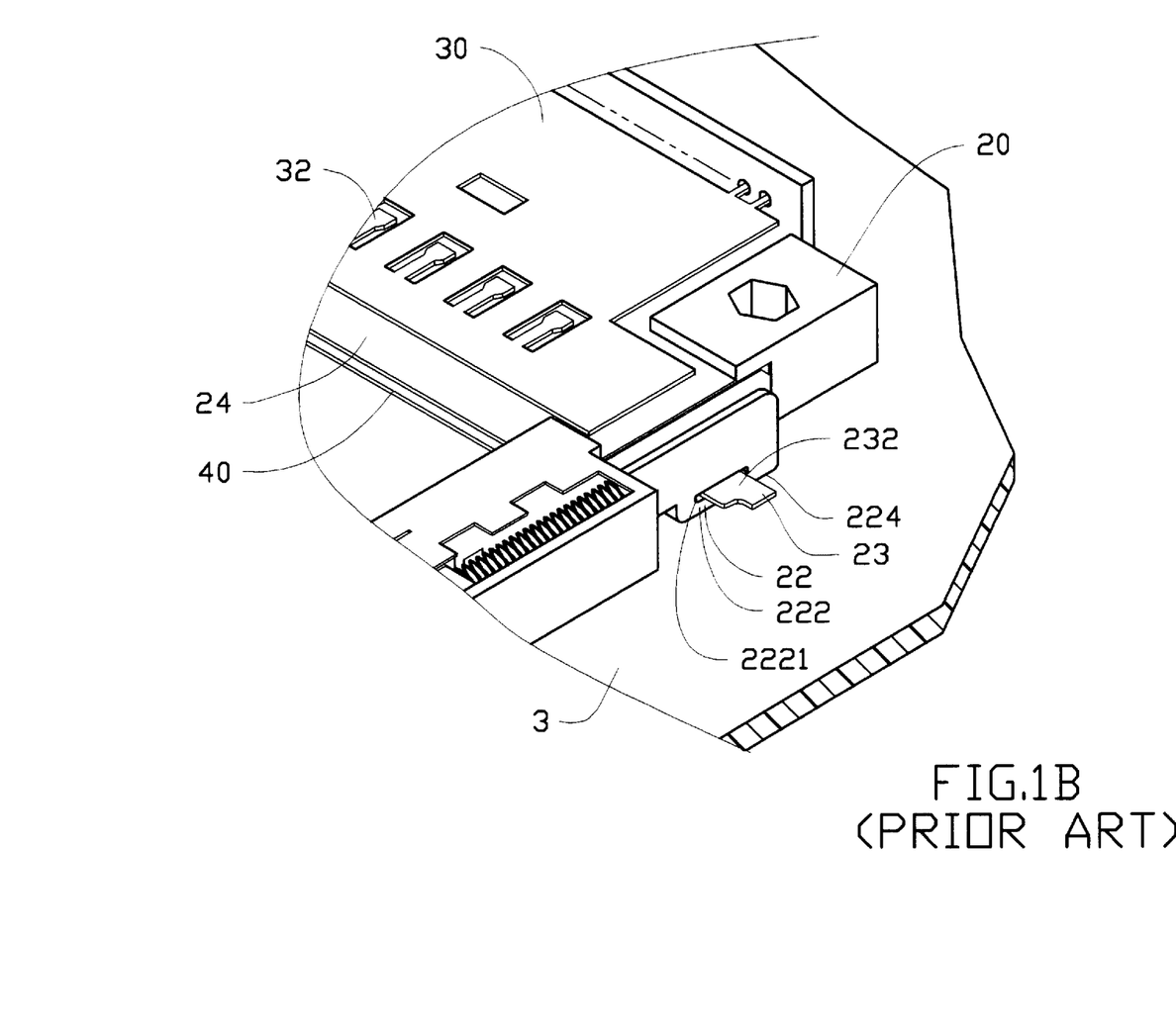
FIG. 1B is an enlarged partial view of FIG. 1A showing a connection between a force-receiving end of an ejector lever and a distal end of a push-rod.
Figure 2:
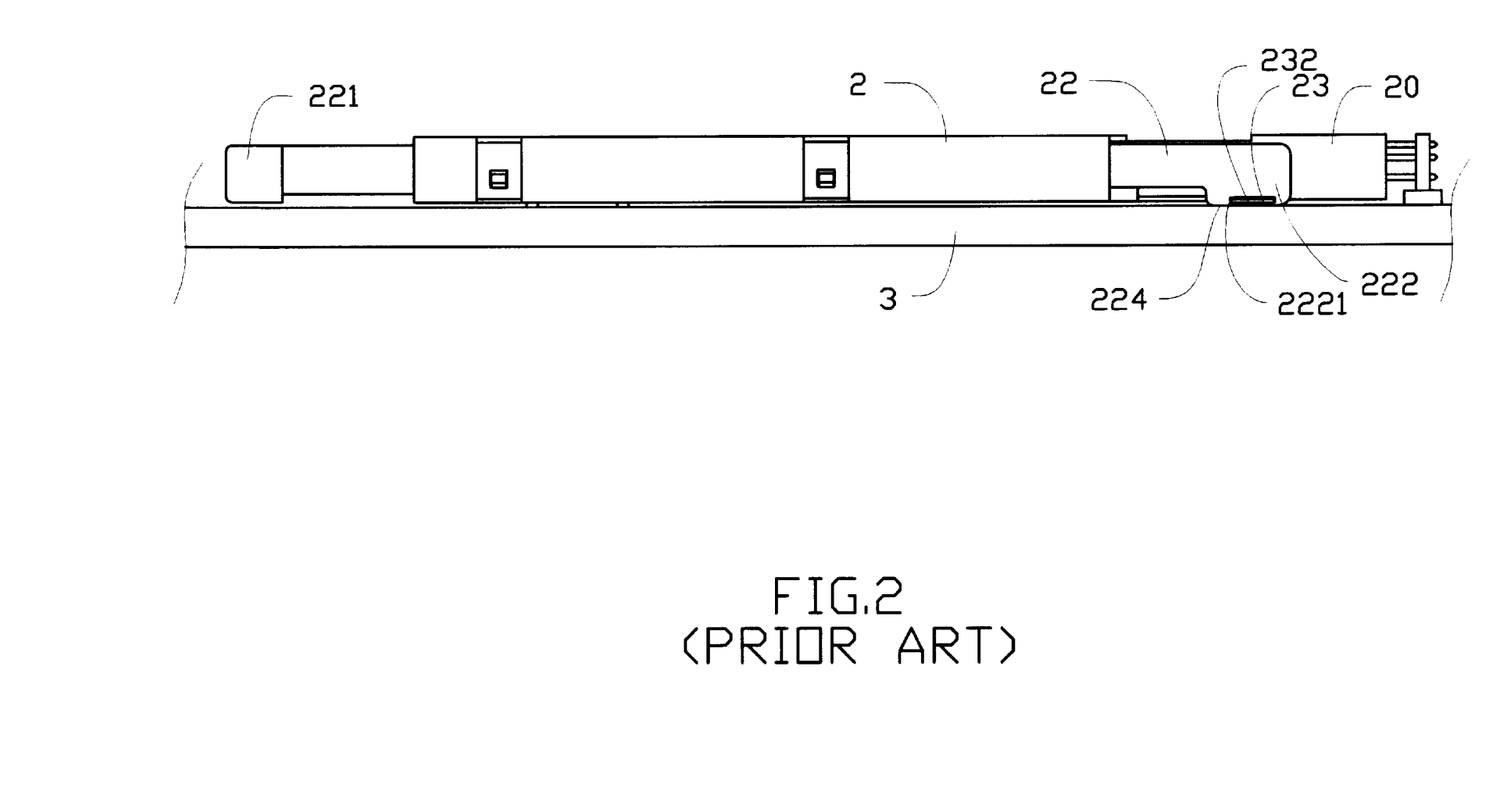
FIG. 2 is a side view of FIG. 1A.

A card bus connector is usually equipped with an ejector mechanism for ejecting an inserted card. As shown in FIGS. 1A to 2, a conventional card bus connector 2 mounted on a printed circuit board 3 includes a housing 20, a guiding frame 21 for guiding a card (not shown) into/out of the connector 2, an ejector mechanism, an upper shielding member 30 attached to a top face of the housing 20, and a lower shielding member 40 attached to a bottom face of the housing 20. The upper shielding member 30 forms eight grounding tabs 32 for engaging with eight grounding contacts on the card inserted into the connector 2. The ejector mechanism consists of a push-rod 22 reciprocally mounted on a right arm of the frame 21 and having a distal end 222 and a proximal end 221 formed as a push-button for receiving a push force to activate the ejector mechanism, an ejector lever 23 pivotably mounted on the lower shielding member 40 and having a force-receiving end 232 horizontally extending through a slit 2221 defined in the distal end 222 of the push-rod 22, and an ejector plate 24 drivably connected with the ejector lever 23, whereby when the ejector lever 23 is pivoted by pushing the push-button 221 toward the housing 20, the ejector plate 24 moves in a direction away from the housing 20 to eject an inserted card.

Particularly referring to FIG. 2, the ejector mechanism of the conventional card connector 2 has the following disadvantages concerning the connecting portion between the push-rod 22 and the ejector lever 23.

To securely connect the ejector lever 23 and the push-rod 22 for avoiding a separation thereof after an extended period of use of the connector 2, the slit 2221 defined in the distal end 222 of the push-rod 22 should have a dimension only slightly larger than that of the force-receiving end 232 of the push-rod 23, whereby great care must be taken during assembly of the push-rod 22 to the ejector lever 23(resulting in low assembly efficiency.

Furthermore, as the ejector lever 23 is mounted on the lower shielding member 40, the force-receiving end 232 thereof is extended slightly above the PCB. In this situation, a bottom edge 224 of the distal end 222 of the push-rod 22 must extend downward very close to the PCB 3 in order to provide a sufficient area to form the slit 2221 large enough to receive the force-receiving end 232 of the ejector lever 23. Since the bottom edge 224 of the distal end 222 of the push-rod 22 is very close to the PCB, a standoff must be provided on the bottom of the connector 2 to space it from the PCB 3; otherwise, the bottom edge 224 of the distal end 222 of the push-rod 22 will scratch the circuit (not shown) on the PCB 3 and cause breakage thereof after the push-rod 22 has been reciprocally moved. However, a standoff provided to space the connector 2 from the PCB 3 will increase the occupied space of the connector 2, which is unfavorable in view of the compact design of computer components.

Taiwan Patent Application No. 84210016 discloses a card bus connector wherein the distal end of the push-rod defines a notch in a middle portion thereof, and the force-receiving end of the ejector lever is bent upward to be retentively received in the notch. Although such a design does not scratch the PCB since the bottom edge is formed at a higher position, the distal end of the push-rod and the force-receiving end of the ejector lever still cannot be easily connected.

U.S. Pat. Nos. 5,421,737, 5,456,610, 5,324,204 and 5,443,395 disclose card connectors having ejector mechanisms with push-rods connected to ejector levers. Although these patents are not particularly related card bus connectors, they form the background art for the present invention.

Hence, an improved ejector mechanism for a card bus connector is needed to eliminate the above mentioned defects of current card bus connectors.

SUMMARY OF THE INVENTION

Accordingly, an objective of the present invention is to provide an ejector mechanism for a card bus connector wherein an ejector lever and a push-rod of the ejector mechanism can be easily connected together.

Another objective of the present invention is to provide an ejector mechanism for a card bus connector wherein the movement of the push-rod of the ejector mechanism will not scratch the PCB on which the card connector is mounted even if there is no standoff provided between the bottom of the card connector and the PCB.

To fulfill the above mentioned objectives, according to a preferred embodiment of the present invention, a card bus connector consists of an elongate housing fixedly receiving a number of contacts having terminal portions electrically connected to a printed circuit board on which the connector is mounted and contact portions opposite the terminal portions for engaging with a card inserted into the connector. A guiding frame is fixed to two mounting arms integrally extending from two lateral ends of the housing. An upper shielding member is fixed to an upper face of the housing and forms eight grounding tabs. A push-rod is reciprocally mounted on the guiding frame and has an L-shaped distal end having a horizontal portion parallel to the PCB and spaced therefrom a sufficient distance, a vertical portion and a hole defined between the horizontal and vertical portions, and a proximal end for receiving a push force. A lower shielding member is fixed to a bottom face of the housing adjacent to the PCB. An ejector lever is pivotably mounted on the lower shielding member and has a force-receiving end bent to extend upright away from the lower shielding member into the hole of the distal end of the push-rod. An ejector plate is reciprocally mounted on the ejector lever and drivably connected thereto. When the push-rod is pushed toward the housing to cause the ejector lever to pivot, the ejector plate is driven by the ejector lever to move away from the housing to eject a card inserted into the connector.

DETAILED DESCRIPTION OF THE PREFERRED EMBODIMENT

Reference will now be made in detail to the preferred embodiment of the present invention.

Figure 3:
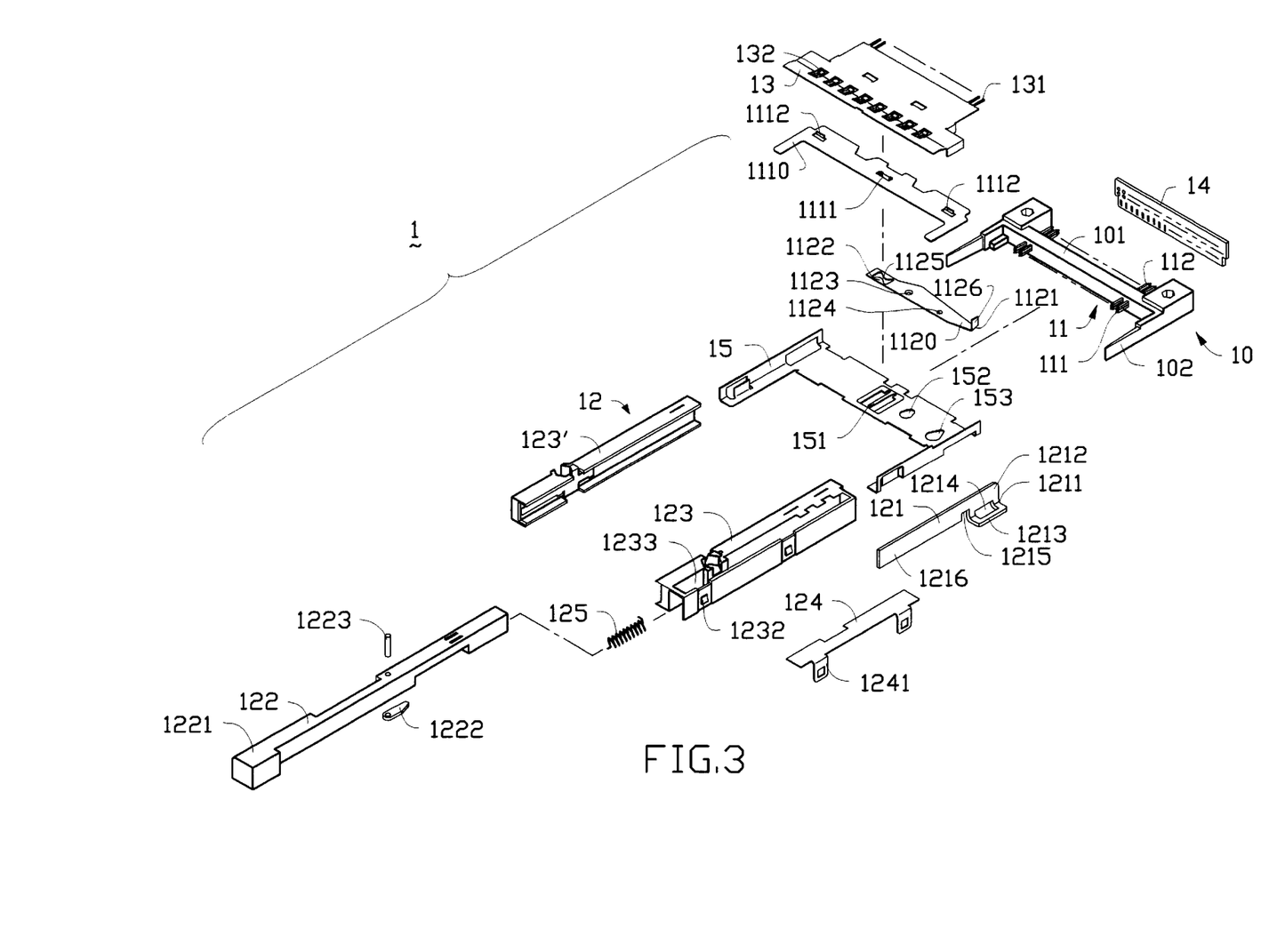
FIG. 3 is an exploded, perspective view of a card bus connector in accordance with the present invention.
Figure 4A:
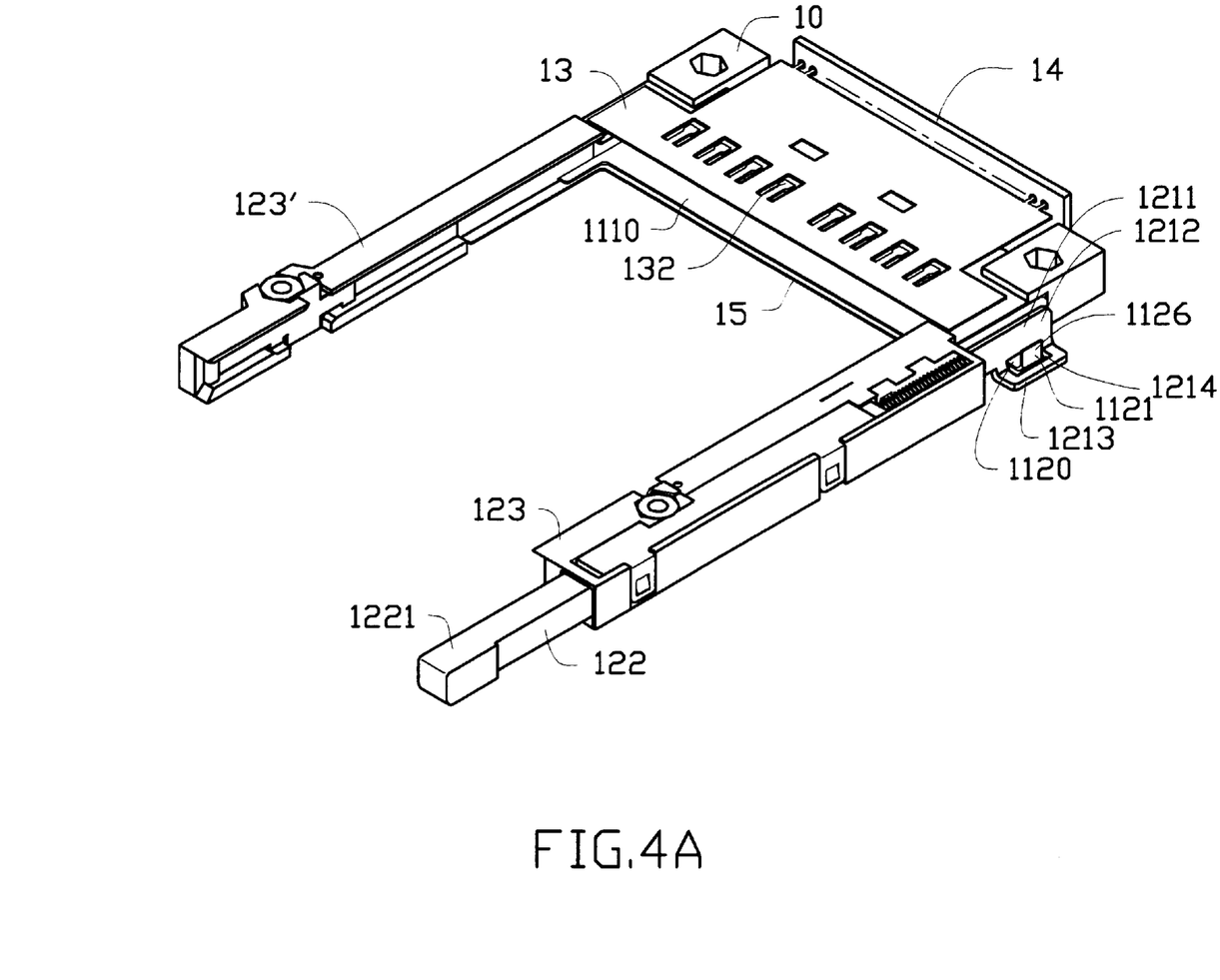
FIG. 4A is an assembled view of FIG. 3.
Figure 4B:
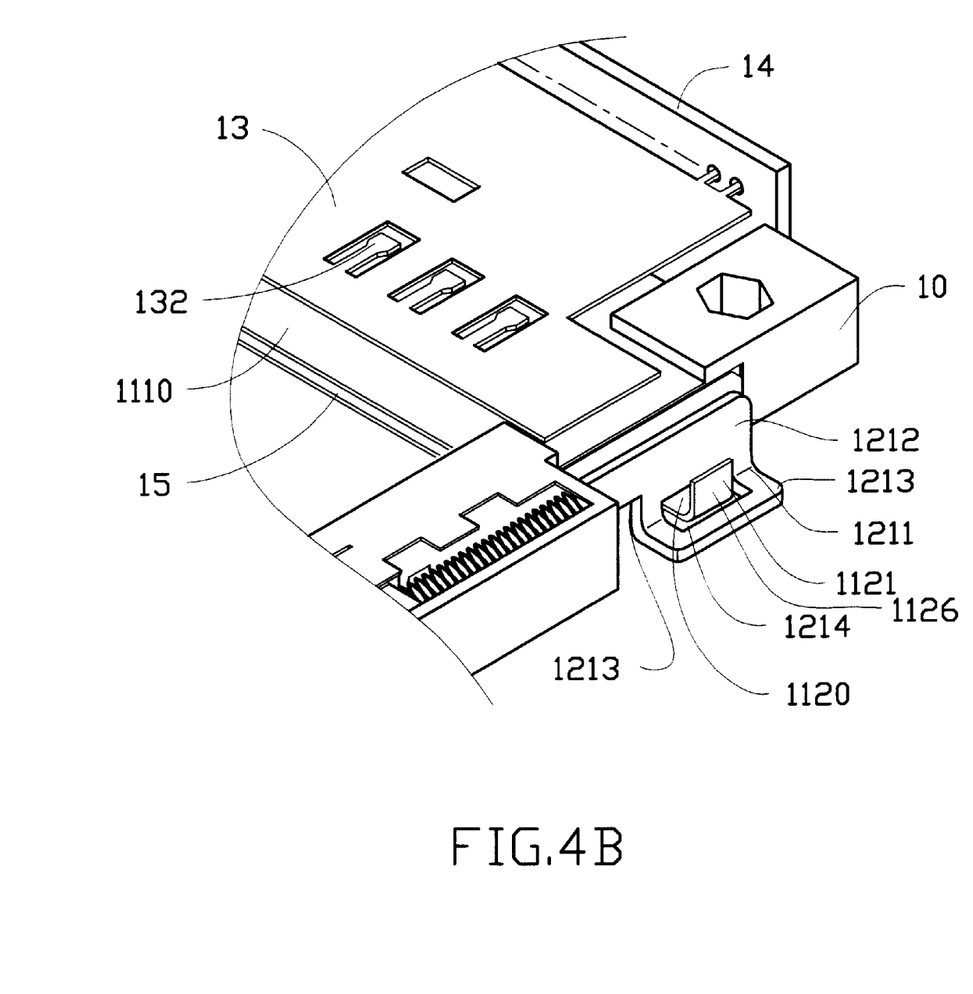
FIG. 4B is an enlarged partial view of FIG. 4A.
Figure 5:
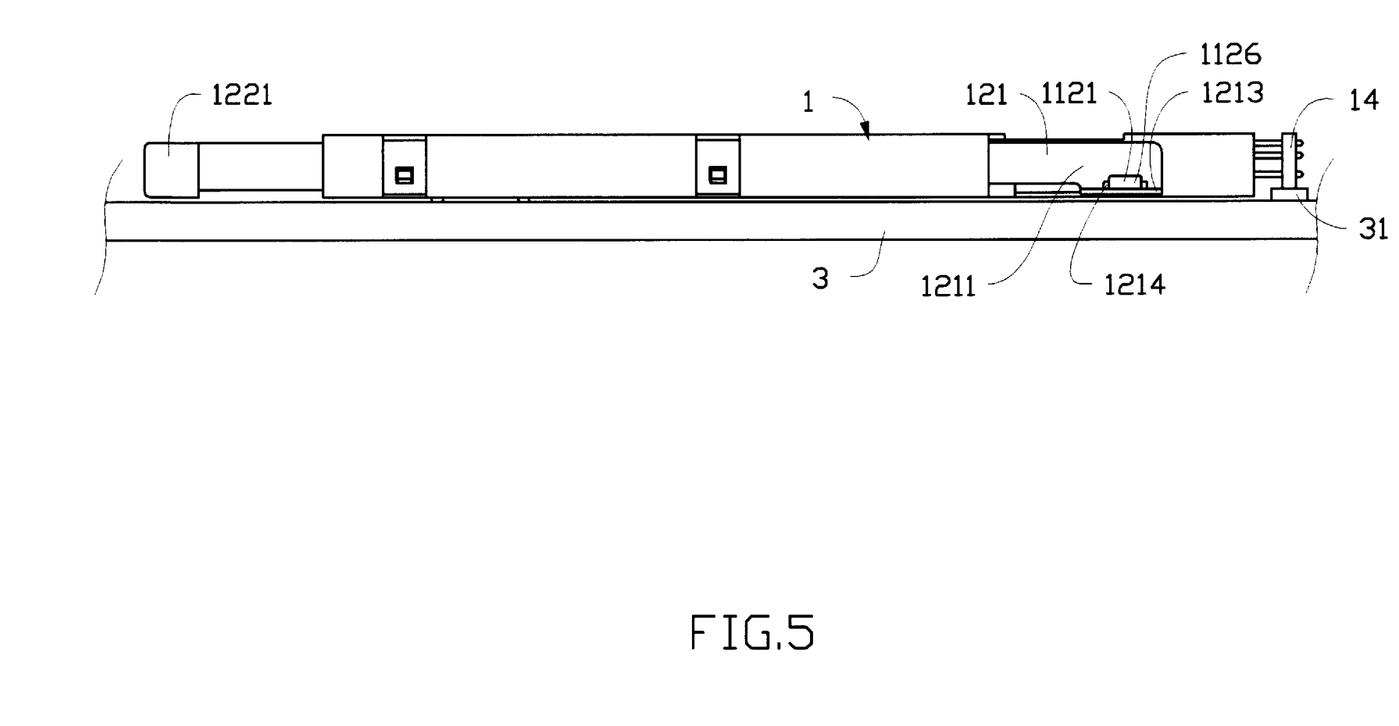
FIG. 5 is a side view of the connector of FIG. 4A mounted on a circuit board.

Referring to FIGS. 3 to 5, a card bus connector 1 in accordance with the present invention includes a header connector 10 having a housing 101 interferentially receiving a number of contacts 11 each having a contact portion 111 for engaging with a card (not shown), such as an I/O card or a memory card inserted into the connector 1, and a terminal portion 112 for being soldered to an adapter 14 inserted into a socket 31 soldered on a PCB 3. Two mounting arms 102 integrally extend forward from lateral sides of the housing 101 for mounting a guiding frame 12 onto the header connector 10. The guiding frame 12 consists of right and left guiding rails 123, 123'. The right guiding rail 123 defines a cavity 1233 in a right side thereof for receiving a push-rod consisting of a rear metal portion 121 and a front plastic portion 122 integrally formed with a push-button 1221 at a front end thereof. A guiding groove (not shown) is defined in the cavity 1233 and for guiding a follower 1222 therealong. The follower 1222 is pivotably mounted on a pin 1223 fixed to the front portion 122 of the push-rod. A spring 125 is positioned in the cavity 1233 between a rear end of the right rail 123 and a rear end of the front portion 122 of the push-rod. Due to the provision of the guiding groove (not shown), the spring 125 and the follower 1222, the front portion 122 of the push-rod can move forward an increased distance to facilitate manipulation of the push-button 1221 for ejection of an inserted card. As this feature is not a part of the inventive features of the present invention, a detailed description thereof is omitted herein and is disclosed in the inventors' co-pending U.S. patent application Ser. No. 08/956,347 filed on Oct. 23, 1997. This co-pending patent application is wholly incorporated into the present application for reference. A cover 124 is fixedly mounted to the right rail 123 to enclose the cavity 1233 for preventing dust or contaminants from entering into the cavity 1233. The cover 124 is fixed to the right rail 123 by engaging two lugs 1241 of the cover 124 with two teeth 1232 formed on the right rail 123.

The rear portion 121 of the push-rod has a rear end 1211 stamped to have an L-shaped configuration. To facilitate the stamping operation, a cut 1215 is formed between the L-shaped rear end 1211 and a front push-force receiving plate 1216. The L-shaped rear end 1211 includes a vertical section 1212, a horizontal section 1213 and a hole 1214 defined therebetween. The front push-force receiving plate 1216 extends into the cavity 1233 to receive a push force from the push button 1221 via the follower 1222.

An upper metallic shielding 13 is fixedly mounted on a top face of the header connector 10 and forms a number of pins 131 soldered to the adapter 14, and eight grounding tabs 132 for engaging with corresponding grounding contacts formed on the card. A lower metallic shielding 15 is fixedly mounted on a bottom face of the header connector 10 and forms a central mounting finger 151, and a small and large mounting hole 152, 153. An ejector lever 1120 is pivotably mounted on the mounting plate 15 by extending two downward protrusions 1123, 1124 into the mounting holes 152, 153, respectively. The ejector lever 1120 defines a force-receiving end 1121 at a right end thereof which has the form of an upright tab 1126, and a force-exerting end 1122 at a left end thereof which has the form of a necked hole 1125. An ejector plate 1110 is reciprocally mounted to the ejector lever 1120. The ejector plate 1110 forms two upright ejecting tabs 1112 at lateral ends thereof, and a downward extending mounting tab 1111 at a center thereof which forms a slit (not shown) therein. The ejector lever 1120 and the ejector plate 1110 are located between the bottom face of the header connector 10 and the lower shielding 15. The lower shielding 15, the ejector lever 1120 and the ejector plate 1110 are mounted together by firstly extending the mounting tab 1111 of the ejector plate 1110 through the necked hole 1125 of the ejector lever 1120 and then extending the mounting finger 151 through the slit defined in the mounting tab 1111 of the ejector plate 1110. When the force-receiving end 1121 of the ejector lever 1120 receives a push force from the push-rod, the ejector lever 1120 pivots about two fulcrums to exert a push force on the mounting tab 1111 of the ejector plate 1110 thereby efficiently ejecting the inserted card out of the connector 1. Details concerning how the ejector lever 1120 pivots about the two fulcrums to activate the ejector plate 1110 are disclosed in Assignee's co-pending U.S. patent application Ser. No. 09/062,871 filed on Apr. 20, 1998 which is wholly incorporated into this application for reference.

To assemble the rear portion 121 of the push-rod with the ejector lever 1120, the rear end 1211 of the rear portion 121 is moved downward toward the force-receiving end 1121 of the ejector lever 1120 to reach a position where the tab 1126 extends a sufficient distance into the hole 1214 above the horizontal section 1213. As the hole 1214 has a dimension sufficiently larger than that of the tab 1126, the rear portion 121 of the push-rod can be easily assembled to the ejector lever 1120. Furthermore, since the tab 1126 extends a sufficient distance into the hole 1214 above the horizontal section 1213, the force-receiving end 1121 will not easily separate from the rear end 1211 of the rear portion 121 of the push-rod even though the hole 1214 has a larger dimension. Finally, as the level of the bottom edge of the rear end 1211 of the rear portion 121 of the push-rod is raised, it will not scratch the PCB 3 when the push-rod is reciprocally moved.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims.

We claim:

1. A combination of a card bus connector and a printed circuit board, comprising:

a printed circuit board; and a card bus connector mounted on the printed circuit board, comprising:

an elongate housing having a bottom face near the printed circuit board and two mounting arms extending from lateral ends of the housing;

a number of contacts fixed to the housing and having contact portions for engaging with a card inserted into the connector and terminal portions electrically connected to the printed circuit board;

a guiding frame fixed to the mounting arms for guiding a card into/out of the connector;

an upper shielding member fixed to an upper face of the housing and forming eight grounding tabs;

a lower shielding member fixed to the bottom face of the housing; and an ejector mechanism, comprising:

a push-rod reciprocally mounted on the guiding frame, having a proximal end for receiving a push force and a distal end having an L-shaped configuration with a horizontal portion parallel to the PCB and spaced therefrom a sufficient distance to ensure that when the push-rod is moved the horizontal portion will not scratch the printed circuit board, a vertical portion perpendicular to and above the horizontal portion, and a hole formed between the horizontal and vertical portions;

an ejector lever pivotably mounted on the lower shielding member, having a force-receiving end extending in a direction away from the lower shielding member into the hole defined in the distal end of the push-rod and a force-exerting end opposite the force-receiving end; and an ejector plate reciprocally mounted on the ejector lever and drivably connected with the force-exerting end thereof whereby when the ejector lever is pivoted by pushing the push-rod toward the housing, the ejector plate moves in a direction away from the housing to eject a card inserted into the connector.

2. The combination in accordance with claim 1, wherein the hole is sufficiently larger than the force-receiving end of the ejector lever.

3. The combination in accordance with claim 1, wherein the force-receiving end extends a sufficient distance above the horizontal portion of the L-shaped distal end of the push-rod.

4. The combination in accordance with claim 1, wherein the push-rod consists of a front portion forming the proximal end, and a rear portion forming the distal end, the rear portion being formed by stamping a metal plate.

5. The combination in accordance with claim 4, wherein a cut is defined in the rear portion of the push-rod adjacent to the L-shaped distal end.

6. An ejector mechanism for use with a card bus connector (1), comprising:

a push-rod including at one end a vertical portion (1212) and a horizontal portion (1213), and a hole (1214) formed in an intersection of said vertical portion (1212) and said horizontal portion (1213) and being communicative with an exterior in a lateral direction while being restrictively isolated from the exterior in a direction along which the push-rod moves with regard to the connector (1); and an ejector lever (1120) being pivotal with regard to a housing (101) of the connector (1), and defining a force-receiving end (1121) and a force-exerting end (1122) opposite to each other; wherein the force-exerting end (1121) is connected to an ejector plate (1110) and moved in an opposite direction with regard to the push-rod, and the force-receiving end (1121) is connected to the push-rod under a condition that a tab (1126), at said force-receiving end (1121), extends upward a sufficient distance into the hole (1214) and above the horizontal portion (1213) so that said force-receiving end (1121) will not easily separate from the push-rod.

\* \* \* \* \*